(12) United States Patent
Hickey et al.

(10) Patent No.: US 7,814,299 B2
(45) Date of Patent: Oct. 12, 2010

(54) DESIGNATING OPERANDS WITH FEWER BITS IN INSTRUCTION CODE BY INDEXING INTO DESTINATION REGISTER HISTORY TABLE FOR EACH THREAD

(75) Inventors: Mark Joseph Hickey, Rochester, MN (US); Adam James Muff, Rochester, MN (US); Matthew Ray Tubbs, Rochester, MN (US); Charles David Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 12/274,560

(22) Filed: Nov. 20, 2008

(65) Prior Publication Data

US 2010/0125719 A1     May 20, 2010

(51) Int. Cl.
*G06F 9/30* (2006.01)

(52) U.S. Cl. .................................. 712/208; 712/210
(58) Field of Classification Search ............... None
See application file for complete search history.

(56) References Cited

U.S. PATENT DOCUMENTS 5,991,870 A * 11/1999 Koumura et al. ............ 712/208
6,385,714 B1 * 5/2002 Koumura et al. ............ 712/219

* cited by examiner

*Primary Examiner*—Kenneth S Kim
(74) *Attorney, Agent, or Firm*—Robert R. Williams

(57) ABSTRACT

A circuit arrangement and method support instruction target history based register address indexing, whereby register addresses to be used by an instruction are decoded using a target history table of previous target register addresses, and an index into the target history table supplied by an index value in the instruction. An instruction may include at least one index value that identifies a previously used register address. During execution of the instruction, the index is retrieved from the instruction, and then a register address is retrieved from the target history table using the index.

1 Claim, 6 Drawing Sheets

FIG. 6
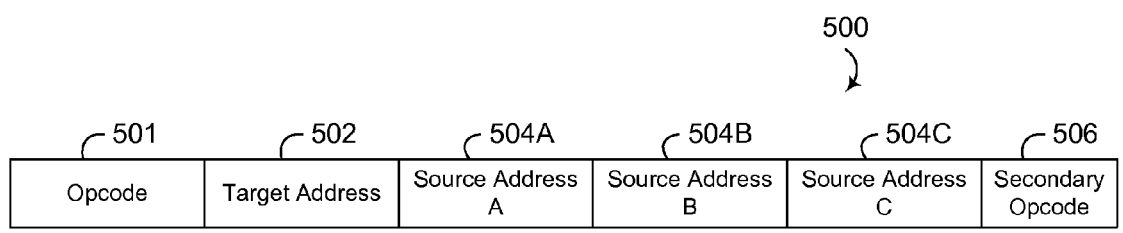
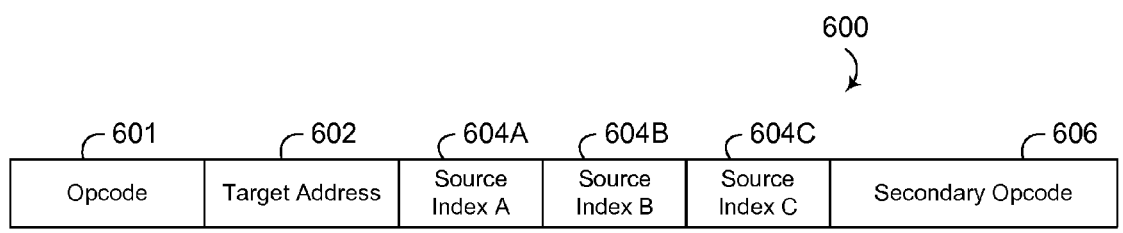

DESIGNATING OPERANDS WITH FEWER BITS IN INSTRUCTION CODE BY INDEXING INTO DESTINATION REGISTER HISTORY TABLE FOR EACH THREAD

FIELD OF THE INVENTION

The invention is generally related to data processing, and in particular to processor architectures and execution units incorporated therein.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an opcode that identifies the type of instruction, as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases. Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by utilizing register address indices as a substitute for source register addresses in the instruction. The register address indices refer to register addresses previously used as target addresses in prior instructions.

Therefore, consistent with one aspect of the invention, a circuit arrangement includes a register file including a plurality of registers configured to store operand data, and execution logic configured to execute instructions from an instruction stream. The circuit arrangement also includes a target address history table coupled to the register file and the execution logic, and is configured to store target addresses used by previously executed instructions and indexed by instruction program order. The target address history table is further configured to, in response to receiving a target address history index, provide the target address associated with that index to the register file. The register file is configured to provide operand data to the execution unit in response to receiving the target address.

Consistent with another aspect of the invention, a method is provided for executing instructions in a processor, where, in response to receiving a first instruction that stores data in a register file using a target address, the target address is stored for later retrieval and indexed by how recently it was used. In response to executing a second instruction of the type that indicates register addresses by target address history table index in place of source register addresses, the target address history index is obtained from the second instruction and used to find the desired previously stored target address.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

BRIEF DESCRIPTION OF THE DRAWINGS

FIG. 6 is an illustration of two instruction formats, the first instruction format suitable for execution by an exemplary AXU Auxiliary Execution Unit as shown in FIG. 3, and the second able to be executed by an AXU Auxiliary Execution unit consistent with the invention and shown in FIG. 5.

DETAILED DESCRIPTION

Embodiments consistent with the invention utilize a target address history index in supported instructions in place of source register addresses. The target address history index corresponds to a target address used by a previous instruction to write to a particular entry in the register file. Embodiments consistent with the invention save the target addresses of instructions that write to the register file, and indexes them by their original program order for later retrieval. Upon decoding an instruction that supports target address history based register address indexing, embodiments consistent with the invention will use the target address history index contained in the instruction to obtain the previously stored target address that will be used as a source address when executing the supported instruction.

Due to the ever expanding number of registers and new instructions in modern microprocessor cores, the address widths present in an instruction encoding continue to widen, and fewer instruction opcodes are available, making it more difficult to add new instructions to existing architectures without resorting to inelegant tricks that have drawbacks such as source destructive operations. The hereinafter described embodiments therefore allow for much greater opcode space in fixed instruction width architectures by using a target address history based index that occupies fewer bits than the full source address, thereby freeing up more bits in the instruction for opcode space.

Other modifications will become apparent to one of ordinary skill in the art having the benefit of the instant disclosure.

Hardware and Software Environment

Figure 1:
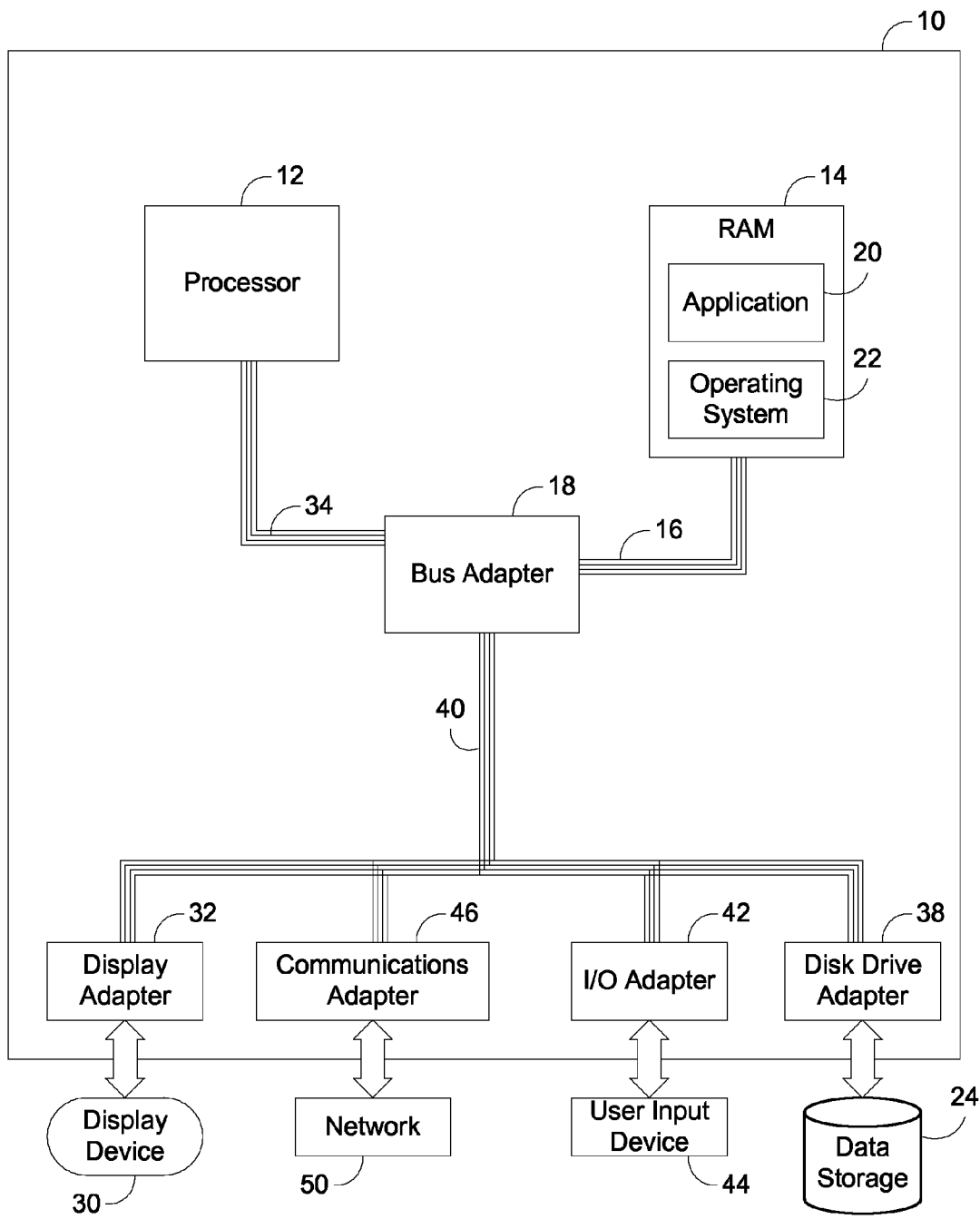
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as a random access memory 14 ('RAM'), which is connected through a high speed memory bus 16 and a bus adapter 18 to processor 12 through a processor bus 34.

Stored in RAM 14 is an application 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on data storage such as a disk drive 24.

Computer 10 of FIG. 1 includes a disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling input and output to and from user input devices 44 such as keyboards and mice. In addition, computer 10 includes a communications adapter 46 for data communications with a data communications network 50. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications. Computer 10 also includes display adapter 32 which facilitates data communication between bus adapter 18 and display device 30, allowing application 20 to visually present output on display device 30.

Figure 2:
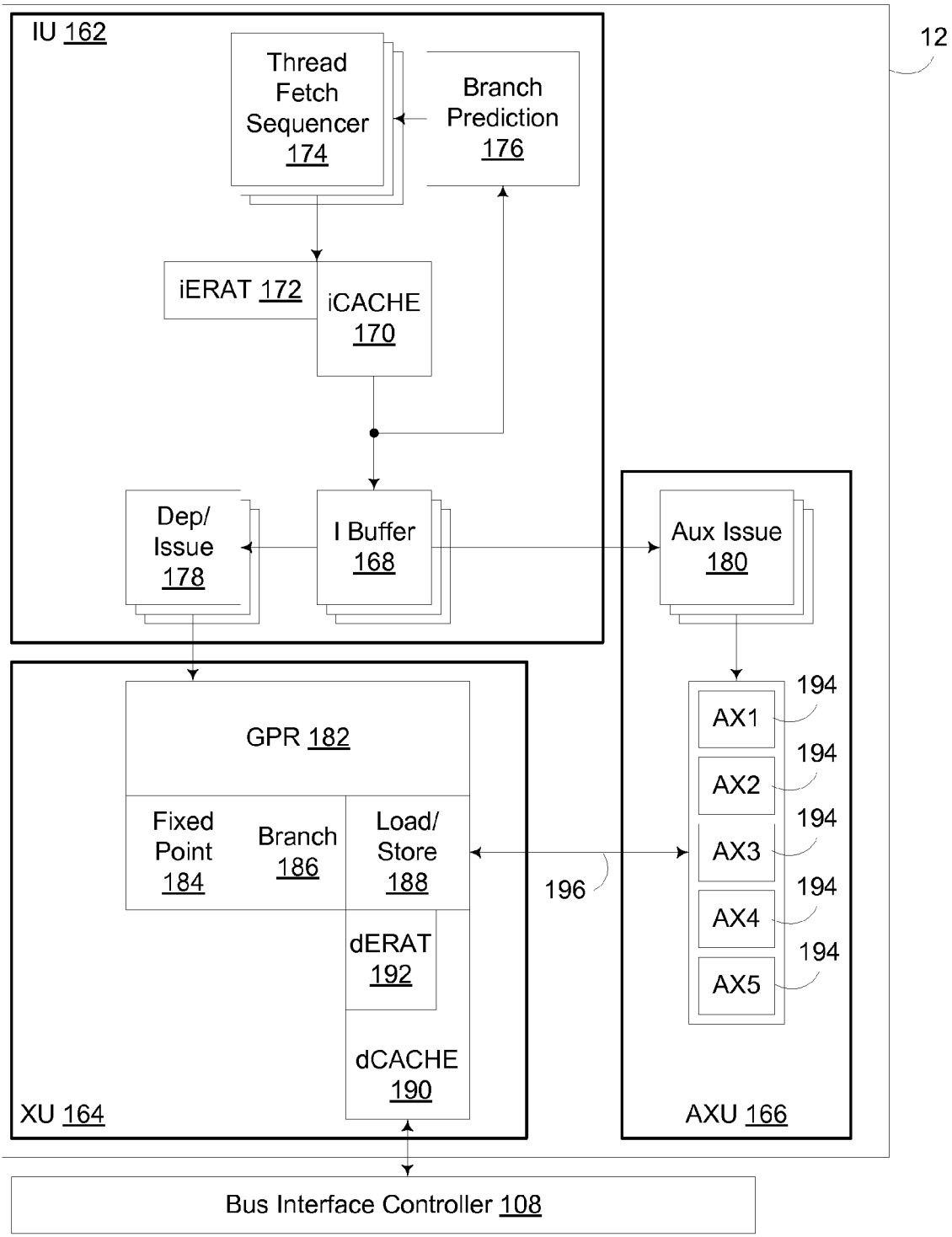
FIG. 2 is a block diagram illustrating in greater detail an exemplary implementation of the processor in FIG. 1.

FIG. 2 next illustrates in another manner one exemplary implementation of a processor 12 consistent with the invention, implemented as a processing element partitioned into an instruction unit (IU) 162, an execution unit (XU) 164 and an auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory, through bus interface controller 108. Each thread fetch sequencer 174 is dedicated to a particular hardware thread, and is used to ensure that instructions to be executed by the associated thread is fetched into the iCACHE for dispatch to the appropriate execution unit. As also shown in FIG. 2, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate auxiliary instruction dependency/issue logic 180 is provided in AXU 166, thus enabling separate instructions to be concurrently issued by different threads to XU 164 and AXU 166. In an alternative embodiment, auxiliary instruction dependency/issue logic 180 may be disposed in IU 162, or may be omitted in its entirety, such that dependency/issue logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including auxiliary instruction dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface 196 to XU 164, e.g., to support direct moves between AXU register contents and XU register contents.

Figure 3:
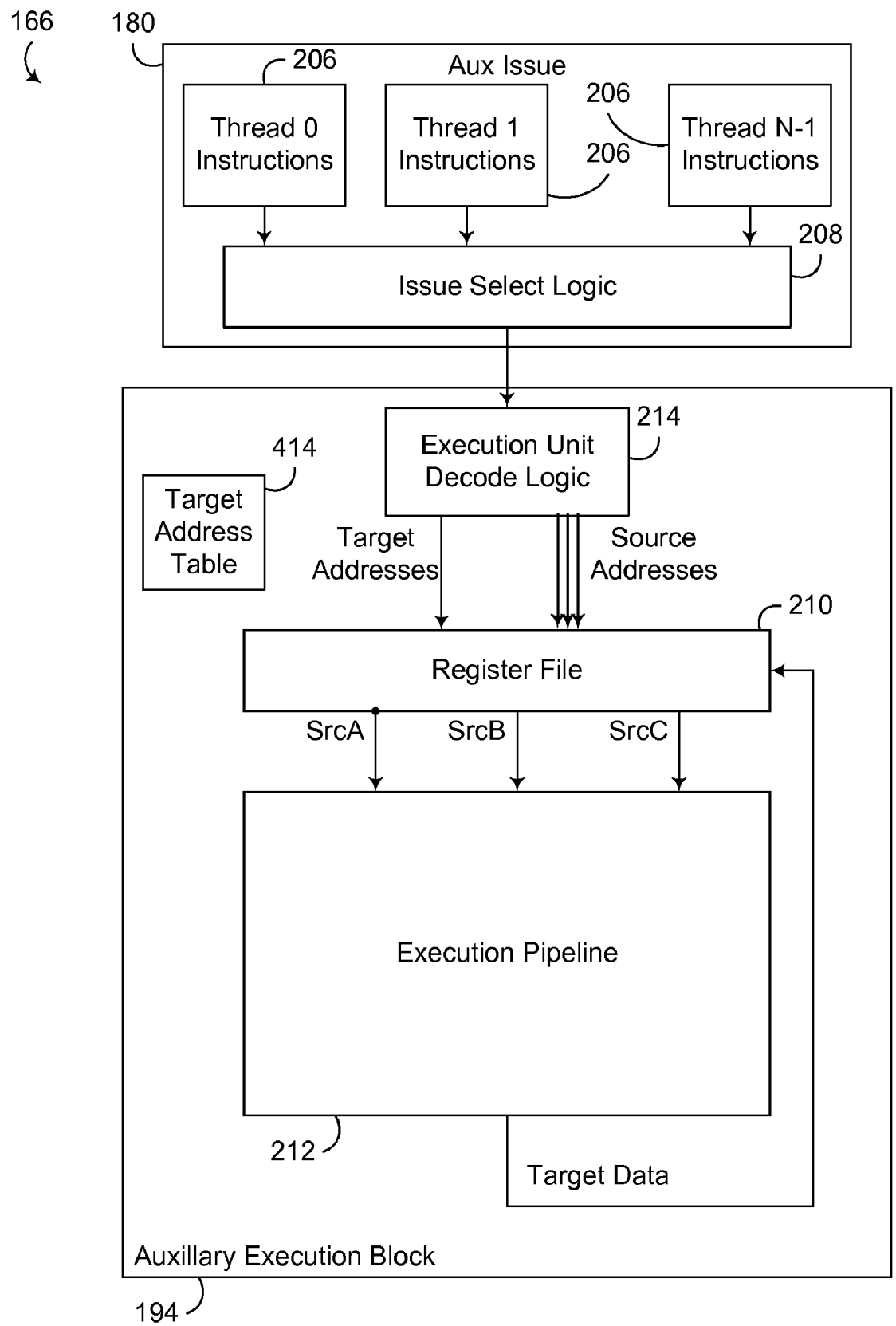
FIG. 3 is a block diagram illustrating an exemplary implementation of an AXU Auxiliary Execution Unit from the processor of FIG. 2.

FIG. 3 illustrates in further detail an exemplary AXU 166 suitable for implementation inside of processor 12 in FIG. 2. AXU 166 is configured with auxiliary instruction dependency/issue logic 180, which is configured to select fair issuance of instructions from multiple threads 206 using an issue select logic 208, which in turn issues instructions from the selected thread to an execution unit decode logic 214 contained in auxiliary execution block 194. Alternatively, other embodiments may be implemented in a single threaded design, where only a single thread is issued to decode logic 214. Execution unit decode logic 214 is configured to obtain target and source addresses from the instruction and provide them to register file 210. Register file 210 is configured to write target data from executed instructions from execution pipeline 212 into a register file entry associated with the target address provided by decode logic 214. Register file 210 is partitioned by thread such that one thread may not read to or write from a partition of another thread. Target address history table 414 is configured to store a table of recently used target addresses separately for each thread. Register file 210 is further configured to read source data (denoted as SrcA, SrcB, SrcC in FIG. 3) from register file entries associated with the source addresses provided by decode logic 214, and provide the source data to execution pipeline 212 for use in execution of the instruction.

Instruction Target History Based Register Address Indexing in an Execution Unit

Figure 5:
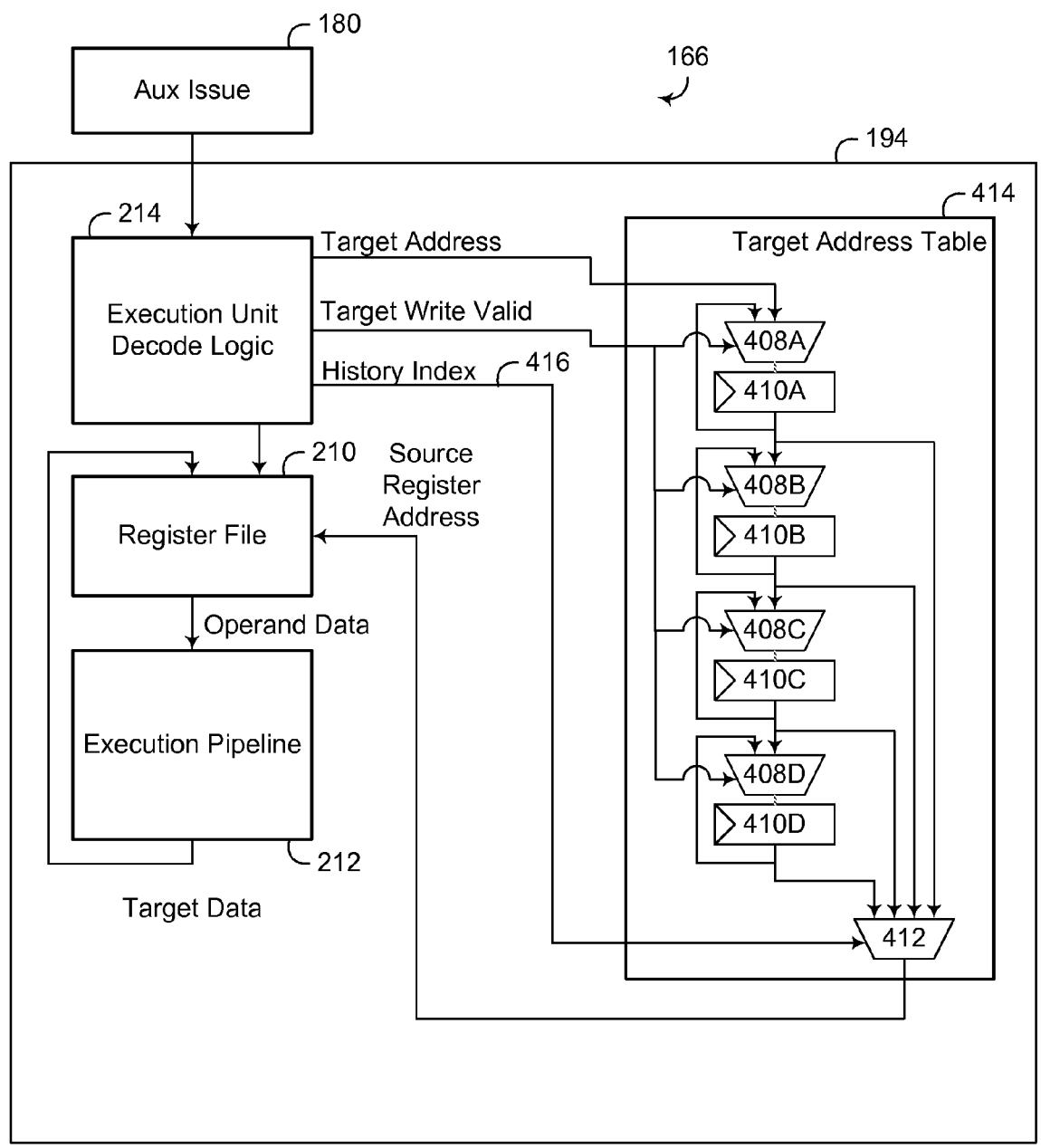
FIG. 5 is a block diagram of a AXU Auxiliary Execution Unit incorporating instruction target history based register address indexing consistent with the invention, and capable of being implemented within the processor of FIG. 2.

Turning now to FIG. 5, this figure illustrates additional detail of an auxiliary processing unit 166 capable of performing instruction target history based register address indexing. Auxiliary execution unit 166 includes an auxiliary instruction dependency/issue logic 180 coupled to execution unit decode logic 214. In the alternative, auxiliary execution unit 166 may be implemented in other processor architectures that issue and execute instructions, including single or multi-core microprocessors or microcontrollers.

Auxiliary instruction dependency/issue logic 180 operates to schedule the issuance of instructions by the various threads, and auxiliary instruction dependency/issue logic 180 typically includes logic for managing dependencies between instructions, in a manner generally understood in the art. Auxiliary instruction dependency/issue logic 180 outputs instructions to execution unit decode logic 214, which causes auxiliary execution unit 166 to initiate execution of received instructions.

Execution unit decode logic 214 receives instructions from auxiliary instruction dependency/issue 180, and decodes the current instruction type, and if the current instruction is of a first instruction type that writes data into the register file, provides a target address, and a target write valid to target address history table 414. Target address history table 414 is configured to receive the target address associated with the current instruction and provide it as an input to multiplexer 408A. Target address history table 414 is also configured to receive the target write valid and provide it as a selector input to multiplexers 408A-408D. Multiplexer 408A is coupled to latch 410A and is configured to provide as input to latch 410*a* either the output of latch 410A if the target write valid is not asserted, or the current target address if the target write valid is asserted. Target address table latches 410A-410D each feed into multiplexers 408A-408D, in such manner that if the current target write valid is not true, meaning the current instruction is invalid or does not write to the register file, then target address table latches 410A-410D hold their previous state. If the target write valid is active then the target addresses held in latches 410A-410D advance down the table. Target addresses advance down the target address history table in a manner such that when a target is written into register file 210 by an instruction, the target address in latch 410A proceeds into latch 410B, and the target address in latch 410B proceeds to latch 410C, and the target address in latch 410C proceeds to latch 410D. Latches 410A-410D may be described as a pipeline, where data advances down through the pipeline. Target address latches 410A-410D are coupled to the input of multiplexer 412. The target address history index 416 from execution unit decode logic 214 is provided to the select input of multiplexer 412, such that the index selects which target address from the target address history table 414 in latches 410A-410D will be provided as an output from multiplexer 412 to register file 210.

A separate target address history table 414 exists for each thread in a multithreaded design.

Auxiliary execution unit 166 includes register file 210 coupled to execution pipeline 212. Register file 210 includes an array of registers, each of which are accessed by a unique address. For example, register file 210 may be implemented to support 64 registers, each accessed by a unique 6 bit address. It will be appreciated that different numbers of registers may be supported in different embodiments.

Register file 210, in response to receiving source register addresses from multiplexer 412, will read operand data contained in the register file entries associated with the source register addresses and provide the required operand data to the execution pipeline 212.

Execution pipeline 212, in response to operand data received from register file 210, performs mathematical, logical or other operations on one or more source operands retrieved from selected registers in register file 210. For example, execution pipeline 212 receives a source operand from register file 210, and may store a result data back into register file 210, e.g., in the form of a target written to a register in the register file associated with the target address from execution unit decode logic 214.

Execution pipeline 212 may be implemented as a number of different types of execution units, e.g., floating point units, fixed point units, or specialized execution units such as graphics processing units, encryption/decryption units, coprocessors, XML processing units, etc.

FIG. 6 illustrates at 500 an exemplary instruction format able to be executed by AXU 166. Instruction format 500 contains 32 bits where the bits include an instruction opcode 501 consisting of 6 bits, a 6 bit target address 502, three 6 bit source addresses 504A, 504B and 504C, and a 2 bit secondary opcode 506. As discussed previously, the 2 bit opcode 506 limits the instruction type to only 4 subtypes of operations, yet typically many more are needed.

FIG. 6 also illustrates at 600 an exemplary instruction format supporting target address history based register addressing and able to be executed by AXU 166 and method 300 (to be described later) consistent with the invention. Instruction format 600 contains 32 bits where the bits include an instruction opcode 601 consisting of 6 bits, a 6 bit target address 602, and three source indices 604A, 604B, and 604C consisting of 2 bits each. In addition, instruction format 600 contains secondary opcode 606 which is 14 bits. The wider secondary opcode 606 allows for a far greater number of instruction subtypes.

The 2 bit source indicies 604A, 604B and 604C may each be used to be supplied as history index 416 to the select input of multiplexer 412 in FIG. 5. In this manner, the source index from the instruction may be used to retrieve the desired address from target address history table 414.

Instruction format 600 may contain any number and combination of source indices versus full source addresses and not depart from the scope of the invention. For instance, in place of source index 604A a full 6 bit register address may be used, reducing the number of available bits in the secondary opcode 606 to 10 bits. Opcodes such as opcode 601 and secondary opcode 606 in the instruction specify which source operands in the instruction are referenced by register addresses directly and which are referenced indirectly via the target address history table.

Figure 4:
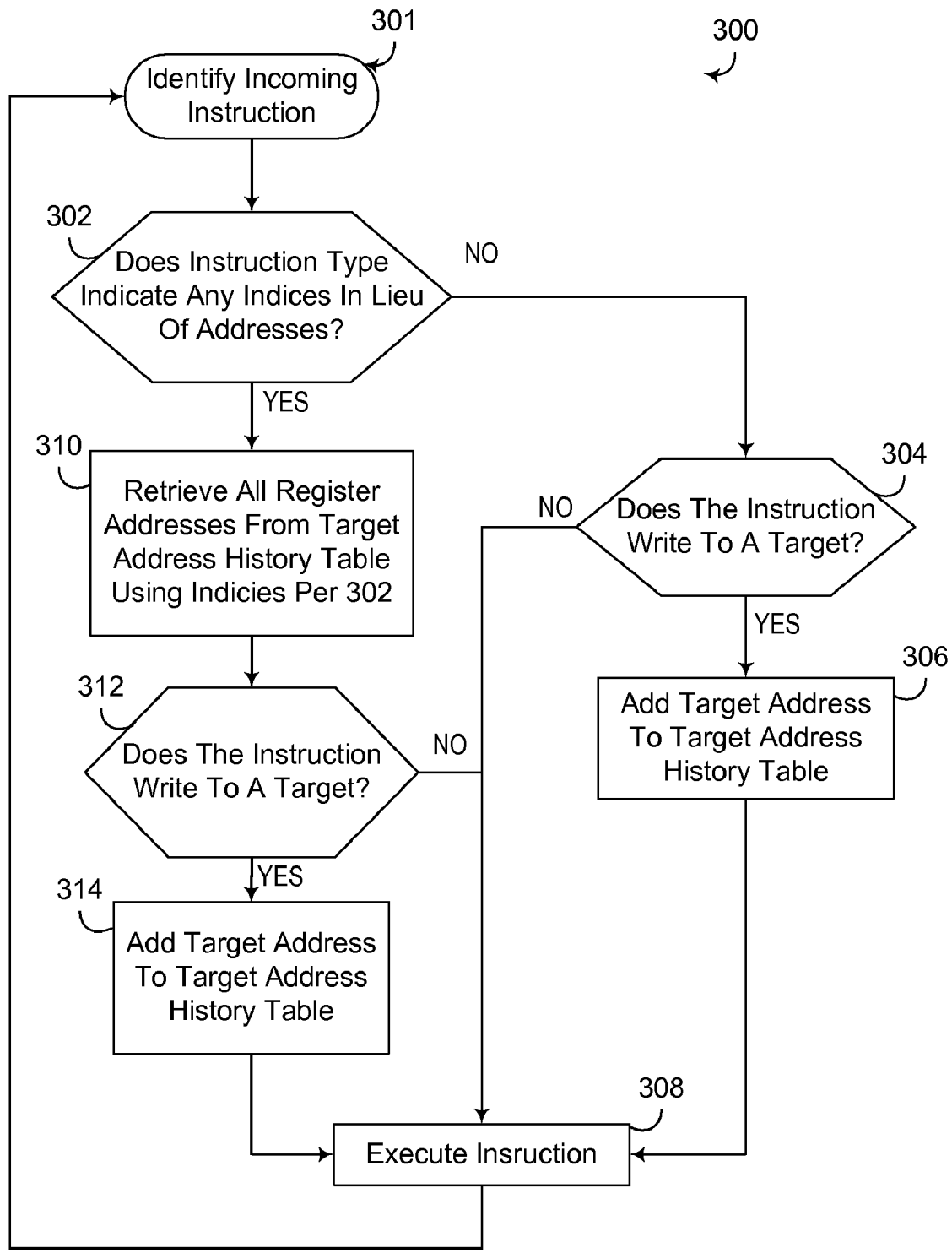
FIG. 4 is a flow chart illustrating an exemplary sequence of operations performed by the AXU Auxiliary Execution Unit of FIG. 3 to implement instruction target history based register address indexing consistent with the invention.

FIG. 4 illustrates a method 300 outlining a sequence of operations performed by auxiliary execution unit 166 when processing instruction from an instruction stream, and supporting target address history based register address indexing consistent with the invention. With this sequence of operations, upon receipt of an incoming instruction, the instruction type is identified in block 301. Control then passes to block 302, where a determination is made as to whether the instruction type of the incoming instruction is of the type that contains any address history indices in place of register addresses. If not, control passes to block 304, where a determination is made as to whether the instruction type will write to a target register. If the instruction is of a type where it does not write to a target register, control passes to block 308 where the instruction is executed, and control passes back to block 301 to identify the next incoming instruction in the instruction stream.

If a determination is made in block 304 that the current instruction is of the type that will write to a target address, then control passes to block 306, when the target address associated with the current instruction will be saved for possible future retrieval in the target address history table. Control then passes to block 308, where the instruction is executed, after which control passes to block 301, where the next instruction in the instruction stream is identified.

If a determination was made in block 302 that the current instruction is of a type that contains target address history indices in place of source addresses, control passes to block 310, where the target address history indices from the instruction are used to retrieve their respective register addresses associated with the indices by how recently they were used as targets.

Control then passes to block 312, where a determination is made as to whether the instruction type will write to a target register. If the instruction is of a type where it does not write to a target register, control passes to block 308 where the instruction is executed using the register addresses obtained from the target address history table in block 310, then control passes back to block 301 to identify the next incoming instruction in the instruction stream.

If a determination is made in block 312 that the current instruction is of the type that will write to a target address, then control passes to block 314, when the target address associated with the current instruction will be saved for possible future retrieval in the target address history table. Control then passes to block 308, where the instruction is executed, after which control passes to block 301, where the next instruction in the instruction stream is identified.

Embodiments of the present invention may be implemented within the hardware and software environment described above in FIGS. 1-6. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

It will be appreciated that various additional modifications may be made without departing from the spirit and scope of the invention. For example, Target address table 414 may have greater than or less than four entries.

Other modifications will be apparent to one of ordinary skill in the art having the benefit of the instant disclosure. Therefore, the invention lies in the claims hereinafter appended.

What is claimed is:

1. A computer configured to have a first thread and a second thread, comprising:

a register file for storing operands, the register file having a first thread portion to store operands for the first thread and a second thread portion to store operands for the second thread;

an execution unit for executing instructions, the execution unit configured to receive a source operand from the register file and write a result back into the register file;

a first target address history table for storing a target register address suitable for addressing a register in the first thread portion in the register file and a second target history table for storing a second target register address suitable for addressing a register in the second thread portion in the register file;

the execution unit configured to execute a first instruction that writes an output into a selected register within the register file, the selected register being in the first thread portion or the second thread portion depending on whether the instruction is from the first thread or the second thread, and is further configured to write the target register address of the selected register within the register file into the first target address history table or the second target address history table; and the execution unit further configured to execute a second instruction that contains a target address history index into the first target address history table or the second target address history table depending on if the second instruction is from the first thread or the second thread, wherein the index retrieves the selected register address from the first target address history table or the second target address history table, the selected register address then being used to retrieve, from the register file, a source operand needed by the second instruction.

* * * * *